UNITED STATES PATENT OFFICE.

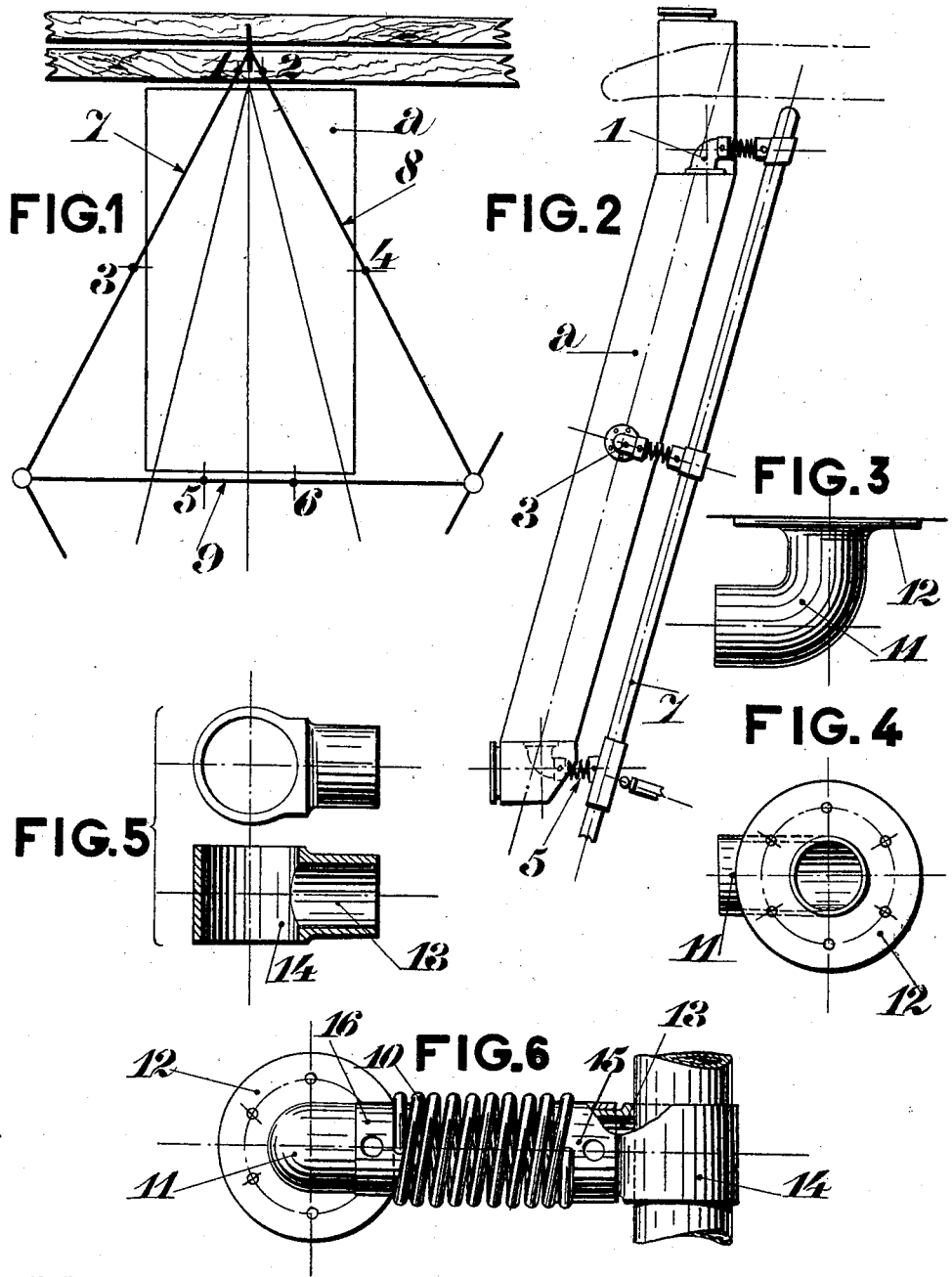

EMILE LETORD, OF MEUDON, FRANCE.

MEANS FOR SUPPORTING RADIATORS ON AEROPLANES.

1,313,195.  Specification of Letters Patent.  Patented Aug. 12, 1919.

Application filed November 13, 1917. Serial No. 201,842.

*To all whom it may concern:*

Be it known that I, EMILE LETORD, a citizen of the French Republic, residing at Meudon, Seine-et-Oise, in France, have invented certain new and useful Means for Supporting Radiators on Aeroplanes, of which the following is a specification.

The present invention has for its object means for supporting or fixing radiators on aeroplanes.

According to the invention springs are arranged between the radiator and its support at certain points for the purpose of absorbing the vibrations of the motor.

The annexed drawings illustrate an example of construction of the invention.

Figure 1 is a diagrammatic view of the mounting of the radiator showing the points of attachment to the tubular support.

Fig. 2 is a side view of the radiator mounted on the tubular supports.

Figs. 3 and 4 represent respectively in elevation and plan a connecting member fixed to the radiator.

Fig. 5 shows in elevation and in section the connecting member to the tubular supports.

Fig. 6 is an elevation of the entire connecting means and shows the cushioning spring.

In Fig. 1 is diagrammatically shown the radiator *a* in place on the tubular supports the connections being indicated by the figures 1, 2, 3, 4, 5 and 6, the tubular supports 7, 8, and 9 being arranged in the form of a triangle.

The fixing unions 11 and 13 of the connecting members are cylindrical and are only connected to one another by the coil springs 10 arranged between them; the unions 11 are fixed on the radiator by means of flanges 12, and the union 13 comprises collars 14 fixed to the corresponding tube support.

The ends of the unions 11 and 13 are inclosed in rings 15 and 16 pinned thereto; the springs 10 are mounted on these rings and each end of the spring is bent over and engaged in an orifice in the corresponding ring.

It can be understood that the vibrations are entirely neutralized by the spring action of the connecting members arranged between the radiator and the tubular supports.

What I claim as my invention and desire to secure by Letters Patent of the United States is:—

1. A radiator support for aeroplane engines, comprising in combination a tubular supporting frame and unions fixed to said frame for attachment of the radiator, each union including a cylindrical member projecting from the frame, a cylindrical member in alinement with the first-mentioned cylindrical member but spaced apart therefrom, and a coiled spring whose ends are fixed upon said cylindrical members respectively.

2. A radiator support for aeroplane engines comprising in combination a tubular supporting frame and unions fixed to said frame for attachment of the radiator, each union including a cylindrical member projecting from the frame, a cylindrical member in alinement with the first-mentioned cylindrical member but spaced apart therefrom, rings fixed upon said cylindrical members and having holes, and a coiled spring whose ends embrace said rings respectively and are bent to engage in said holes.

3. A radiator support for aeroplane engines comprising in combination a tubular supporting frame and unions fixed to said frame for attachment of the radiator, each union including a cylindrical member having at one of its ends a collar embracing a tube of the frame, a cylindrical member in alinement with the first mentioned cylindrical member but spaced apart therefrom, and a coiled spring whose ends are fixed upon said cylindrical members respectively.

4. A radiator support for aeroplane engines, comprising in combination a triangular supporting frame and unions fixed to said frame for attachment of the radiator, each union including a cylindrical member projecting from the frame, a cylindrical member in alinement with the first-mentioned cylindrical member but spaced apart therefrom, and a coiled spring whose ends are fixed upon said cylindrical members respectively.

In witness whereof I have signed this specification in the presence of two witnesses.

EMILE LETORD.

Witnesses:
 JEAN GERMAIN,
 MARIN VACHON.